(No Model.)  2 Sheets—Sheet 1.

I. KITSEE.
STOCK CAR.

No. 252,777. Patented Jan. 24, 1882.

Attest
Chas. F. Gessert
Horatio V. Croll

Inventor
Isidor Kitsee
By Geo. J. Murray
Atty (No Model.) 2 Sheets—Sheet 2.

I. KITSEE.
STOCK CAR.

No. 252,777. Patented Jan. 24, 1882.

Attest
Chas. F. Gessert
Horatio V. Croll

Inventor
Isidor Kitsee
By Geo. P. Murray
Atty

UNITED STATES PATENT OFFICE.

ISIDOR KITSEE, OF CINCINNATI, OHIO.

STOCK-CAR.

SPECIFICATION forming part of Letters Patent No. 252,777, dated January 24, 1882.

Application filed August 9, 1881. (No model.)

*To all whom it may concern:*

Be it known that I, ISIDOR KITSEE, of Cincinnati, county of Hamilton, State of Ohio, have invented certain new and useful Improvements in Stock-Cars, of which the following is a specification.

The objects of my present invention are, first, an improved means to simultaneously furnish the animals with food; second, an improved means of watering the stock *in transitu;* third, an improved folding stall-side to permit the car to be used upon the return-trip for conveying box or other freight; fourth, a means to rapidly secure the animals in place and release them without danger to the attendant. These objects are attained by the means illustrated in the accompanying drawings, in which—

Figure 1:
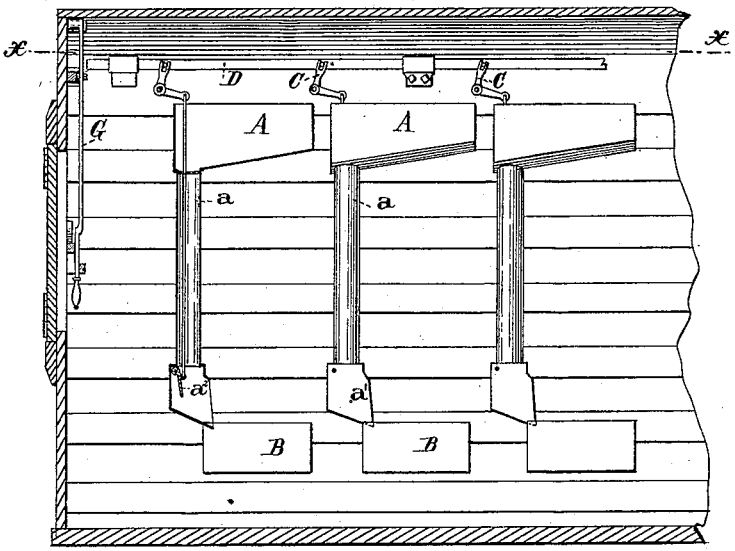
Figure 2:
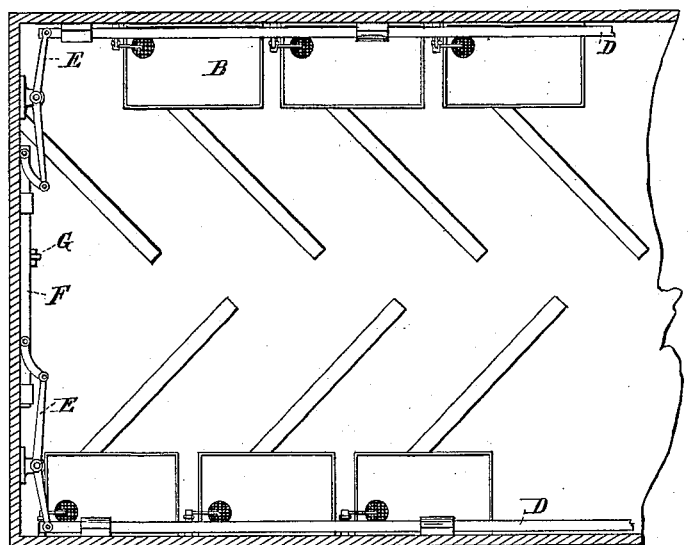
Figure 6:
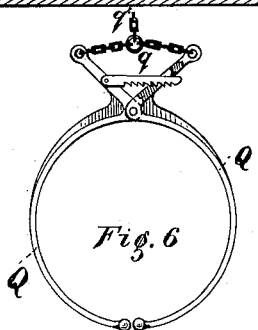
Figure 3:
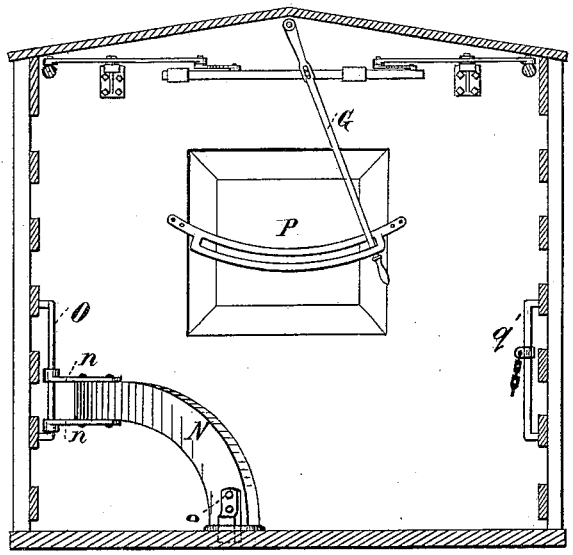
Figure 4:
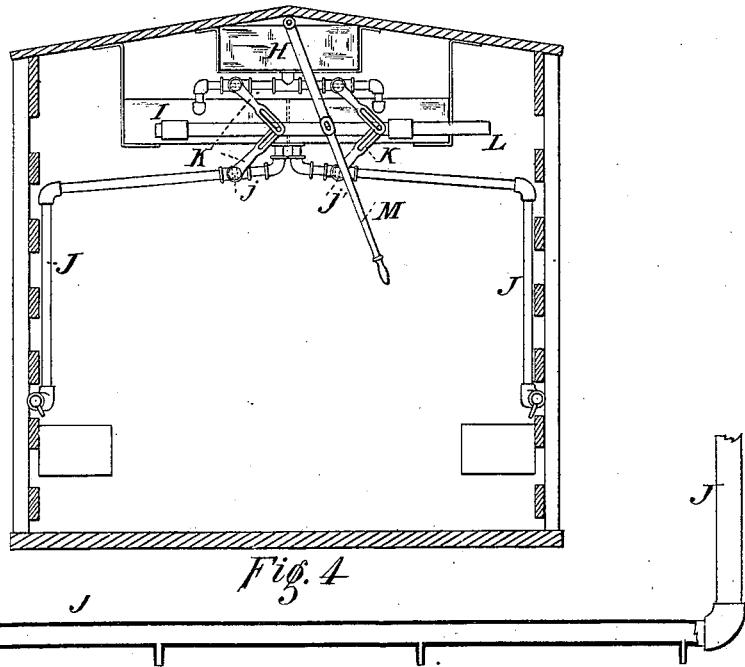
Figure 5:
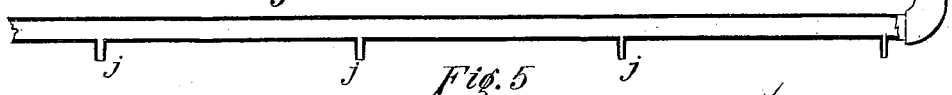

Figure 1 is a longitudinal vertical section of a portion of a car provided with my improvements. Fig. 2 is a horizontal section of the same, taken in line $x$ $x$ of Fig. 2. Fig. 3 is a vertical transverse section taken near the end of the car and having the watering apparatus removed to expose more clearly the lever and its attachments by which the feed is discharged into the troughs. My stall-side is also shown here. Fig. 4 is a similar view, illustrating in plan view the lever and attachments to supply the animals with water. Fig. 5 is a longitudinal section of the supply-pipe and nipples through which the water flows into the troughs. Fig. 6 is an enlarged plan view of the clasp for securing the animals in place.

Throughout the various views the same parts are indicated by the same reference-letters.

Referring to the parts, A represents grain-receptacles secured to the sides of the car near the top, the bottoms of these inclined in every direction toward the spout $a$, which is of a size to hold one "feed" of grain. The bottom of the spout terminates in a square shoe, $a'$, which discharges the grain into the troughs B. Within the shoe $a'$ is a hinged trap, $a^2$, which is actuated by a rod, one end of which is jointed to the upper side of the trap and the opposite end jointed to one end of the bell-crank C. The opposite ends of the bell-cranks C are jointed by means of slots and pins to a sliding bar, D, which moves in guides $d$, secured to the car-side. The bars D are moved in their guides by levers E, secured in fulcrums which project from the end of the car. These levers E are in turn linked to a sliding rod or bar, F, so that when the bar is moved by its lever G, which is fulcrumed upon a pin near the roof of the car, and connected to the bar by a pin passing through a slot in the lever, the bars D will be simultaneously moved in the same direction and the trap-valves in the grain-spout simultaneously opened or closed.

The arrangement for watering the stock will now be described.

H is a reservoir extending the full length of the car, excepting only the space occupied at one end by the valve-actuating devices, which control the supply of food and water.

I is a measuring-vessel, located at one end of the car. It is designed to hold enough of water to supply all the troughs once.

J J are pipes extending from the measuring-vessel along the sides of the car above the troughs. These pipes are provided with nipples $j$, which discharge into the troughs.

The general arrangement, form, and location of these parts are the same as the similar parts shown in my Patent No. 244,258, dated July 12, 1881. They differ in having the measuring-vessel divided longitudinally with the car by a central partition and in making the discharge-orifices in the nipples small near the source of supply and gradually larger toward the opposite end of the car. I found with my former arrangement the troughs upon one side would overflow before those upon the other side would be supplied whenever the car inclined to one side. I also found that the troughs nearest the source of supply would overflow before those farther from it would be filled. The first of these defects is remedied by the partition, which makes an independent measuring vessel for each row of troughs, and the last by making the orifices larger as the pressure of the water decreases. The valves which control the supply of water from the reservoir to the measuring-vessels and from the measuring-vessels to the pipes J are actuated by slotted levers K, sliding bar L, and hanging lever M. The lever M is fulcrumed upon the same pin as lever G, and this and the valve-levers K are connected to the sliding bar L by pins secured in the bar and passing through the slots in the levers, so that when the lever is in the position shown the connections between the reservoir and measuring-vessels are open, and by turning the lever-handle to the opposite side of the car these connections are closed and the cocks $j'$, which were previously closed, are opened to allow the water in the measuring-vessels to be discharged into the troughs. So soon as the flow through the nipples ceases the lever is returned and locked in its former position.

My improved stall-side (see Fig. 3) consists of a curved piece, N, preferably of oak or other hard tough wood, and metal strap $n$, which are secured to the piece N near its upper end. These strap-pieces have eyes at their ends, through which a staple, O, secured to the side of the car, passes. The lower end of the side N is provided with metal pins or bolts $o$, which, when the stall-side is in the position shown, pass through metal plates secured on the floor and hold the side in place. To fold the stall-sides against the side of the car-sides, they are elevated to withdraw the pins $o$ from their sockets, (or if sliding bolts be used these are withdrawn,) and the side N is then swung around upon the staple O. They are thus folded out of the way and the car-body left clear for the reception of other freight.

The clasps, Fig. 6, which secure the animals in their stalls, consist of two hinged members, Q, formed like an ice-tongs, except that the upper portion of each member returns back from the joint, instead of crossing, so that pressing the upper ends of the members together opens instead of closing the lower points. To one of the members is pivoted a toothed latch, $q$, which extends across and passes through a slot in the opposite member. The teeth of the bar engage an angular projection at the bottom of slot and hold the lower ends of the tongs closed. A chain, $q^2$, passes through eyes in the upper ends of the pivoted members, and a branch chain from this has a ring at the opposite end, (not shown,) which passes over a vertical staple, $q'$, secured to the side of the car. Thus the ring may slip freely up and down, permitting the animal to rise or lie down, while at the same time his movement backward is limited.

In chaining cattle in their stalls by the methods heretofore in use much time was consumed, and with wild cattle much danger encountered. By my fastening device these difficulties are overcome, as the attendant can stand in the adjoining stall, or even outside of the car, and hold the upper ends of the clasp together and the device above the animal when it enters the stall. So soon as the animal's head reaches the front of the stall the device is dropped upon its neck and released, when it closes and locks itself. It is released by throwing up the latch $q$ and pressing the upper ends together, which can be done with one hand.

The levers G and M are operated through an opening in the end of the car closed by a sliding door, P.

Having thus described my invention, what I claim is—

1. In a stock-car, the combination, substantially as specified, of feed-box A, a measuring-spout, $a$, closed at its lower end by a valve, $a^2$, with a valve-rod, a crank, C, and crank-actuing bar D.

2. The combination, substantially as hereinbefore set forth, of feed-boxes A, their measuring-spouts $a$, valves $a^2$, and valve-rods with cranks C, sliding rod D, lever E, sliding bar F, its connecting-links, and lever G, said parts being arranged to simultaneously supply the troughs B with food, as set forth.

3. In a stock-car, the combination of reservoir H, divided measuring-vessel I, and pipes J with lever K, sliding bar L, and lever M, arranged to operate substantially as specified.

4. The combination, substantially as before set forth, of the car-body, the stalls arranged in longitudinal series therein, the water-troughs for said stalls, a water-supply vessel at one end of the car having pipes leading therefrom to supply the troughs, and the nipples for discharging into said troughs, the opening in each nipple being larger than those intervening between it and the supply-vessel.

5. The combination, substantially as specified, of the car-body and staples O with stall-sides composed of side pieces, N, eye-straps $n$, and pins $o$.

6. The combination, as specified, of the car-body having vertical staple-bars $q'$, secured thereto, with a chain and sliding ring, $q^2$, and a securing device consisting of two pivoted members, Q, and a locking-member, $q$, for the purpose set forth.

ISIDOR KITSEE.

Witnesses:
GEO. J. MURRAY,
HORATIO V. CROLL.